J. KENNEDY.
BOLT ANCHOR.
APPLICATION FILED AUG. 20, 1917.
1,352,199.
Patented Sept. 7, 1920.
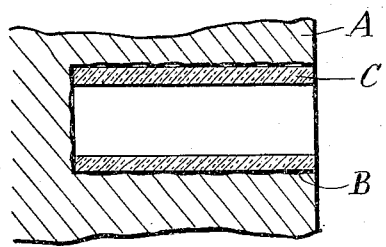
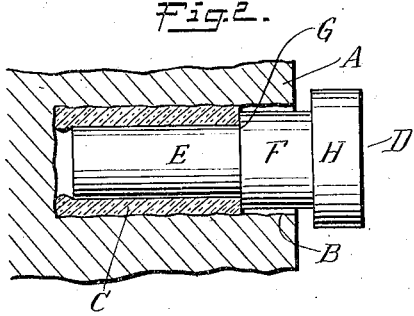
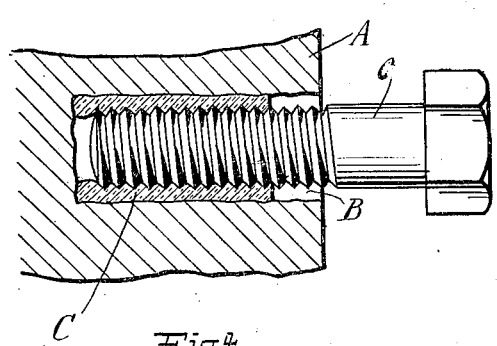
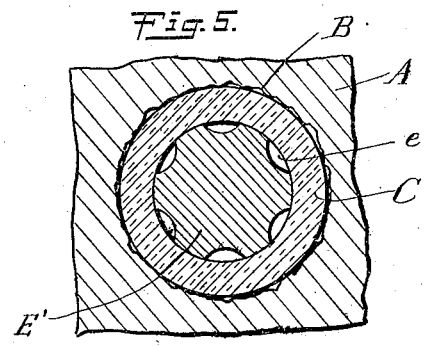
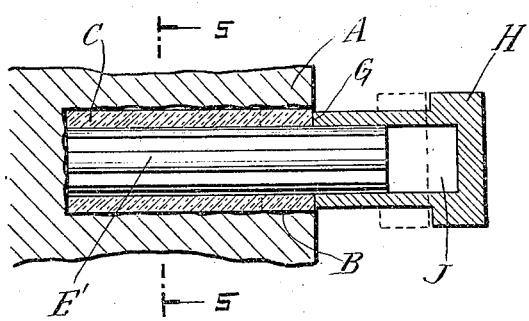
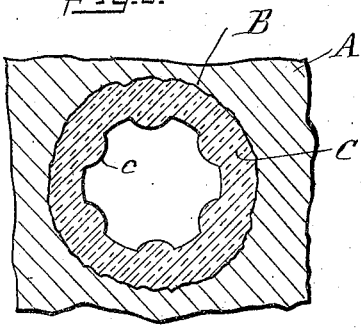
Inventor
Joseph Kennedy
By his Attorneys
Marshall & Dearborn

UNITED STATES PATENT OFFICE.

JOSEPH KENNEDY, OF RICHMOND HILL, NEW YORK, ASSIGNOR TO THE CLEMENTS CO., OF NEW YORK, N. Y., A CORPORATION OF NEW YORK.

BOLT-ANCHOR.

1,352,199.  Specification of Letters Patent.  Patented Sept. 7, 1920.

Application filed August 20, 1917. Serial No. 187,064.

*To all whom it may concern:*

Be it known that I, JOSEPH KENNEDY, a citizen of the United States of America, and a resident of Richmond Hill, county of Queens, and State of New York, have invented certain new and useful Improvements in Bolt Anchors, of which the following is a specification, reference being had to the accompanying drawings, forming a part thereof.

This invention relates to an improved bolt anchor for securing a threaded element as a bolt or other fastening device, in an aperture in a wall or other building construction of brick, stone, cementitious material and the like, and to methods of anchoring a threaded element to such a structure.

The object of this invention is to improve upon the means and the methods heretofore available for securing a bolt or the like to a structure of such material that the threads of a device of this character will not engage directly with it.

Another object is to provide a simple device by means of which a sleeve of deformable metal may be expanded outwardly in a recess by means of inward longitudinal pressure applied to its outer end.

In order that my invention may be thoroughly understood I will now proceed to describe the same in the following specification, and then point out the novel features thereof in appended claims.

Referring to the drawings:

Figure 1 is a longitudinal sectional view showing the anchor in a wall before expansion.

Fig. 2 is a similar view showing the use of a tool to swage and crowd the sleeve into the hole in the wall.

Fig. 3 is a similar view with the tool removed and with a bolt screwed into the expanded sleeve.

Fig. 4 is a longitudinal elevation mostly in section, showing a modified form of swaging tool.

Fig. 5 is a transverse section taken on the line 5—5 of Fig. 4 showing the parts before expansion.

Fig. 6 is a transverse section on the same line with the tool removed illustrating the condition of the sleeve after expansion.

Like characters of reference designate corresponding parts in all the figures.

A in all the figures designates a portion of a wall or other building construction, of brick, for instance, and B is the hole for the anchor. C is a deformable sleeve of soft metal as lead or an alloy of lead. This is inserted in the hole B as shown in Fig. 1. Then a tool D such as that shown in Fig. 2 having a body E is inserted in the sleeve with an annular shoulder G abutting against the outer end thereof, the neck F of the tool being of substantially the same diameter as that of the hole. H designates the head of the tool which may be struck with a hammer to cause deformation and outward expansion of sleeve while the tool is being driven into the position in which it is shown in Fig. 2. During this operation the body E of the tool prevents inward lateral expansion of the sleeve but the material of the sleeve is expanded and forced into all the irregularities of the wall of the anchorage aperture.

Then the tool is removed and a threaded bolt O is inserted. The bolt will cut its own threads in the soft metal of the sleeve and will be securely held in place. The sleeve is in such intimate engagement with the wall that the bolt may be unscrewed if desired and reinserted in the same threads which were cut by its first insertion.

If it is desired to have the body of the tool extend to the bottom of the hole, it may be made separate from the rest of the tool as shown in Fig. 4. In this figure the body part of the tool is designated by E'. The neck F and H are similar to these parts of the tool of Fig. 3 which has been described, but a central hole J is drilled in them for the reception of the part E'.

The operation of this tool is similar to that already described. The body E' telescopes into the hole J as the end of the sleeve is driven inwardly. When the grooves $e$ are provided, the greater part of the sleeve is held against inward expansion, but some of the metal of the sleeve runs into these grooves to form the ribs $c$. These ribs facilitate the first insertion of a bolt.

This application is a continuation in part of an application filed by me on the 13th day of August, 1914, and given Serial No. 856,612.

What I claim is:

1. The method of anchoring a threaded element which consists in forming a recess in the body to which the threaded element is to be anchored, inserting a deformable sleeve of relatively soft ductile material in said recess and then outwardly expanding said sleeve by holding the inner end of the sleeve against inward longitudinal movement and holding at least a part of the wall of the bore of the sleeve against inward lateral movement, and applying inward longitudinal pressure to the outer end of the sleeve, whereby said sleeve is brought into tight engagement with said body, and thereafter screwing the threaded element directly into the bore of the sleeve.

2. The method of anchoring a threaded element which consists in forming a recess in the body to which the threaded element is to be anchored, inserting a deformable sleeve of relatively soft ductile material in said recess and then laterally expanding said sleeve by holding the inner end of the sleeve against inward longitudinal movement and holding portions of the wall of the bore of the sleeve against inward lateral movement, and applying inward longitudinal pressure to the outer end of the sleeve, whereby the outer surface of said sleeve is brought into tight engagement with said body and the portions of the wall of the bore of the sleeve which have not been held are expanded inwardly, and thereafter screwing the threaded element directly into the sleeve.

In witness whereof I have hereunto set my hand this 14th day of August, 1917.

JOSEPH KENNEDY.

Witnesses:
  I. B. MOORE,
  WILLIAM G. DALTON.